United States Patent [19]

McEwan

[11] Patent Number: 5,457,394
[45] Date of Patent: Oct. 10, 1995

[54] IMPULSE RADAR STUDFINDER

[75] Inventor: Thomas E. McEwan, Livermore, Calif.

[73] Assignee: The Regents of the University of California, Oakland, Calif.

[21] Appl. No.: 58,398

[22] Filed: May 7, 1993

Related U.S. Application Data

[63] Continuation-in-part of Ser. No. 44,745, Apr. 12, 1993, Pat. No. 5,345,471.

[51] Int. Cl.[6] .......................... G01S 13/04; G01R 29/02
[52] U.S. Cl. ........................ 324/642; 324/67; 342/22; 342/27
[58] Field of Search ........................ 324/67, 326, 329, 324/337, 533, 637, 642–646; 340/552–554; 342/22, 27, 28, 459

[56] References Cited

U.S. PATENT DOCUMENTS

| | | | |
|---|---|---|---|
| 3,102,232 | 8/1963 | Leonard et al. | 324/644 |
| 4,023,154 | 5/1977 | Comeaux | 324/533 |
| 4,057,708 | 11/1977 | Greeley et al. | 364/423 X |
| 4,072,942 | 2/1978 | Alongi | 324/337 X |
| 4,008,469 | 2/1977 | Chapman | 324/337 X |
| 4,099,118 | 7/1978 | Franklin et al. | 324/67 X |
| 4,132,943 | 1/1979 | Gournay et al. | 324/337 X |
| 4,464,622 | 8/1984 | Franklin | 324/67 |

OTHER PUBLICATIONS

S.V.B; news Ground–piercing radar aims at commercial market, *Microwaves* Dec. 1973, p. 12.

Ludien, Jerry R. "Terrain Analysis by Electromagnetic Means; Radar Responses to Laboratory Prepared Samples"; U.S. Army Engineer Waterways Experiment Station Corps of Engineers, Technical Report No. 3–693, Report 2, pp. III–IV and 1–23, Sep. 1966.

*Primary Examiner*—Gerard R. Strecker
*Attorney, Agent, or Firm*—Henry P. Sartorio

[57] ABSTRACT

An impulse radar studfinder propagates electromagnetic pulses and detects reflected pulses from a fixed range. Unmodulated pulses, about 200 ps wide, are emitted. A large number of reflected pulses are sampled and averaged. Background reflections are subtracted. Reflections from wall studs or other hidden objects are detected and displayed using light emitting diodes.

20 Claims, 6 Drawing Sheets

IMPULSE RADAR STUDFINDER

The United States Government has rights in this invention pursuant to Contract No. W-7405-ENG-48 between the United States Department of Energy and the University of California for the operation of Lawrence Livermore National Laboratory.

RELATED APPLICATIONS

This application is a continuation-in-part (CIP) of Serial No. 08/044,745, filed Apr. 12, 1993, now U.S. Pat. No. 5,345,471, issued Sep. 6, 1994.

BACKGROUND OF THE INVENTION

This invention relates generally to sensors for locating hidden objects and more particularly to sensors for locating wall studs.

A common problem faced by anyone attempting to hang a picture or cabinet is how to precisely locate between-wall studs so a sturdy hook may be attached or clearance may be provided for the cabinet. Since wall studs are usually covered by sheetrock or wallboard and finished-off, stud location is not visible. A similar problem arises when hanging plants and lamps from the ceiling, or when nailing down squeaky floorboards and stair steps.

General methods for locating studs and joists include tapping with a hammer, searching for nails with a magnetic compass, and random piercing with a nail. Hammer tapping and magnetic compass searching are unreliable and time-consuming, and random piercing is destructive. Once a nail is located, it may be off-center. Also, the stud may be warped, making it impossible to deduce accurate stud location at any distance from the nail.

These primitive methods were vastly advanced when an electronic wall stud sensor became commercially available about ten years ago. The user places the sensor flat against the wall and scans it laterally across the extent of the wall. When it passes over a stud, a vertical series of LEDs light to indicate the presence of the stud behind the wall. The sensor is based on dielectric density sensing. U.S. Pat. No. 4,099,118 describes a portable electronic wall stud sensor having capacitor plates and circuitry for detecting changes in the capacitive charge due to changes in the dielectric constant in the wall adjacent the sensor. U.S. Pat. No. 4,464,622 describes a similar capacitive sensor with calibration means and means for detecting an AC line in the wall.

Dielectric density sensing has limitations. If a small air gap forms between the sensor and the wall, the device becomes inoperative due to the substantial change in density adjacent the two sensing plates that are internal to the unit. It is therefore difficult or impossible to locate studs on rough or highly textured surfaces.

Another limitation is that stud detection is directly affected by the dielectric constant of the intervening wall material. Sheetrock, plywood, particle board, and dense hardwoods vary in dielectric constant to such an extent that a dielectric sensor generally only works on sheetrock and not on plywood walls, wood floors, stair steps, furniture or cabinetry.

SUMMARY OF THE INVENTION

Accordingly it is an object of the invention to provide an improved stud finder or other hidden object locator.

It is another object of the invention is to provide a stud finder or other hidden object locator that is not based on capacitive measurements of change in dielectric constant.

The invention is an impulse radar studfinder which transmits a sequence of short impulses, without a carrier, and detects the reflected impulses after a fixed time period representing a fixed range. A large number of pulses are averaged, or integrated, to produce an output signal. The presence of hidden objects, e.g. wall studs, behind the wall produces the reflected pulses.

BRIEF DESCRIPTION OF THE DRAWINGS

FIGS. 4A–D illustrate pulse shaping for off-surface invariance.

FIG. 4A shows the preferred pulse shape with a unipolar peak and exponential tail while

DETAILED DESCRIPTION OF THE PREFERRED EMBODIMENTS

The sensor is based on the pulse-echo radar principle of clocking the two-way time of flight of an electromagnetic pulse. It is called impulse radar because an unmodulated, "video", or baseband pulse is radiated rather than the usual sinusoidal burst found in conventional radar. The pulses are just a sequence of impulses; there is no carrier. There is no specific frequency associated with this radar; rather, its frequency spectrum is related by the Fourier transform of the pulse. The free-space radiated pulse is a Gaussian-shaped impulse about 200 picoseconds wide. A major advantage to impulse radar is that its spectrum is located as close to DC as possible, where materials attenuation is the lowest.

Operation is based on emitting a pulse from a transmit antenna, waiting for a brief period of time corresponding to about 2 inches of round trip time of flight at the speed of light, and then opening a gate connected to a receive antenna to allow the reflected pulse to be sampled. This process is repeated at a 1 MHz rate, allowing approximately 10,000 receive pulses to be averaged prior to driving a signal intensity display.

The high level of averaging reduces the random noise accompanying the sampled signal to such an extent that extremely low amplitude signals can be detected. Repetitive operation also leads to extreme simplification of the entire circuit.

The invention utilizes an impulse radar ultra-wideband receiver as described in U.S. Pat. application Ser. No. 08/044,745 filed Apr. 12, 1993, now U. S. Pat. No. 5,345,471 issued Sep. 6, 1994, by Thomas E. McEwan entitled "Ultra-Wideband Receiver," which is herein incorporated by reference.

Figure 1:
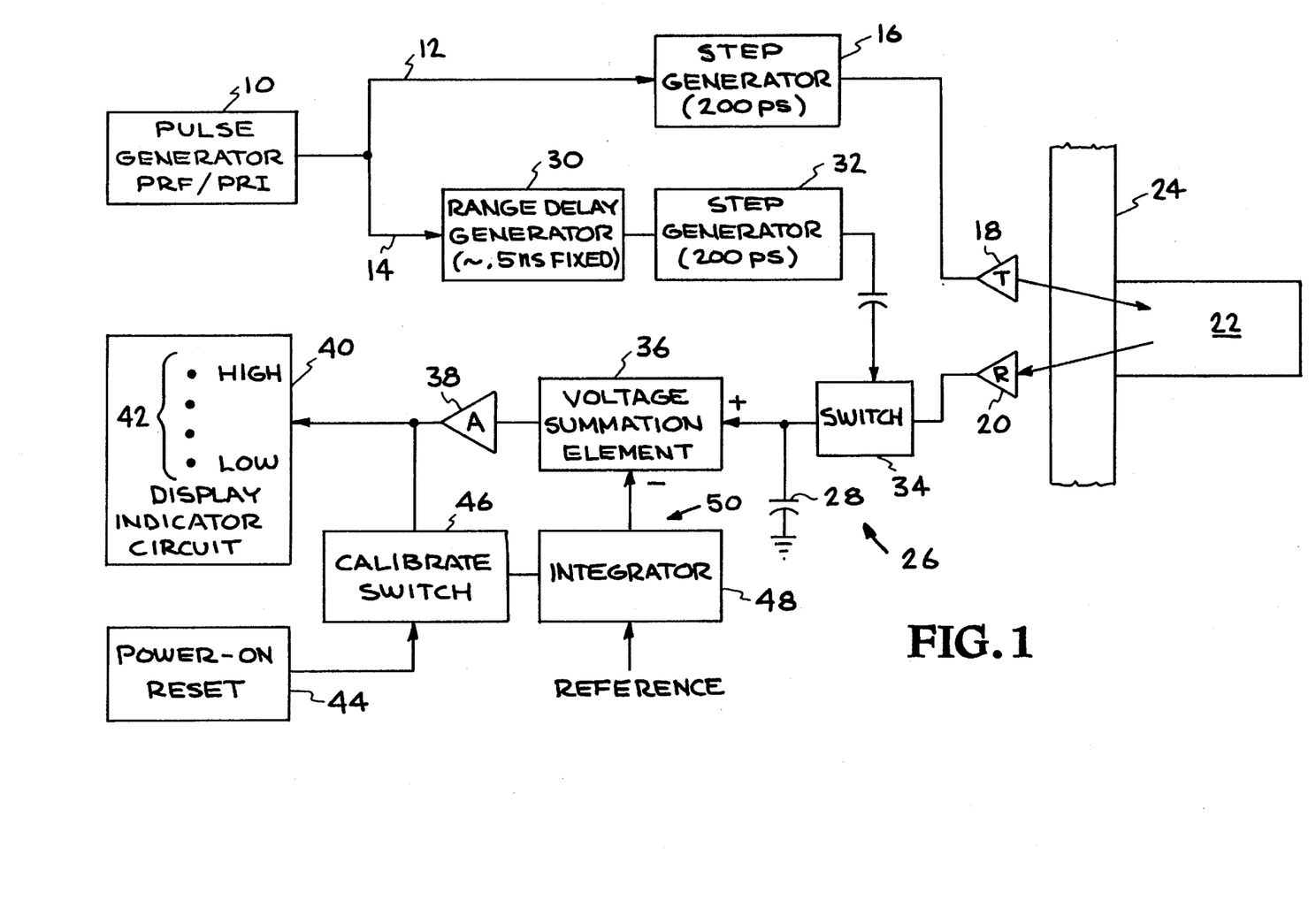
FIG. 1 is a block diagram of the impulse radar studfinder.

A block diagram of the sensor is given in FIG. 1. Pulses from a 1 MHz pulse repetition frequency (PRF) or pulse repetition interval (PRI) generator 10 are input into two parallel paths, transmit path 12 and receive or gating path 14. In the transmit path 12, PRF/PRI generator 10 drives a step generator 16, which provides a transmit pulse with a +5 to 0 volt, 200 ps transition that is applied to the transmit antenna (T) 18. The electrical length of the antenna is set to be short relative to the spectral content of the voltage step, so differentiation occurs in the antenna and a 200ps wide impulse is radiated. In effect, the antenna is shorter than a half wavelength of the highest frequency component in the voltage step.

The receive antenna (R) 20 picks up the reflected impulse from stud 22 behind wall board 24 and applies it to a sample/hold (S/H) circuit 26 that is gated by a pulse from gating path 14 that is delayed approximately 0.5 ns from the time that the transmit antenna radiates the impulse. Pulses from PRF/PRI generator 10 which are input into transmit path 12 are simultaneously input into gating path 14 where they pass through range delay generator 30 followed by step generator 32 which produces a 200 ps gating pulse which controls gating switch 34. Delay generator 30 is set at about 0.5 ns so that the impulse radar range is about 1–2". The gating pulse closes switch 34 so that reflected pulses from the 1–2" range are input into sample/hold circuit (S/H) 26. The S/H circuit 26 is formed of a capacitor 28 connected to ground. Reflections, or lack thereof, occurring 1–2" from the antennas 18, 20 are thereby sampled. The size of the capacitor 28 in the sample/hold 26 circuit is sufficiently large that each sample only partially charges it, and approximately 10,000 samples are required for the circuit to reach an equilibrium with the receive antenna signal. The product of the impedance of the receive antenna 20 and the capacitance of capacitor 28 yield a time constant which is much greater than the width of the gate pulse, so it takes many pulses to charge capacitor 28.

Figure 2:
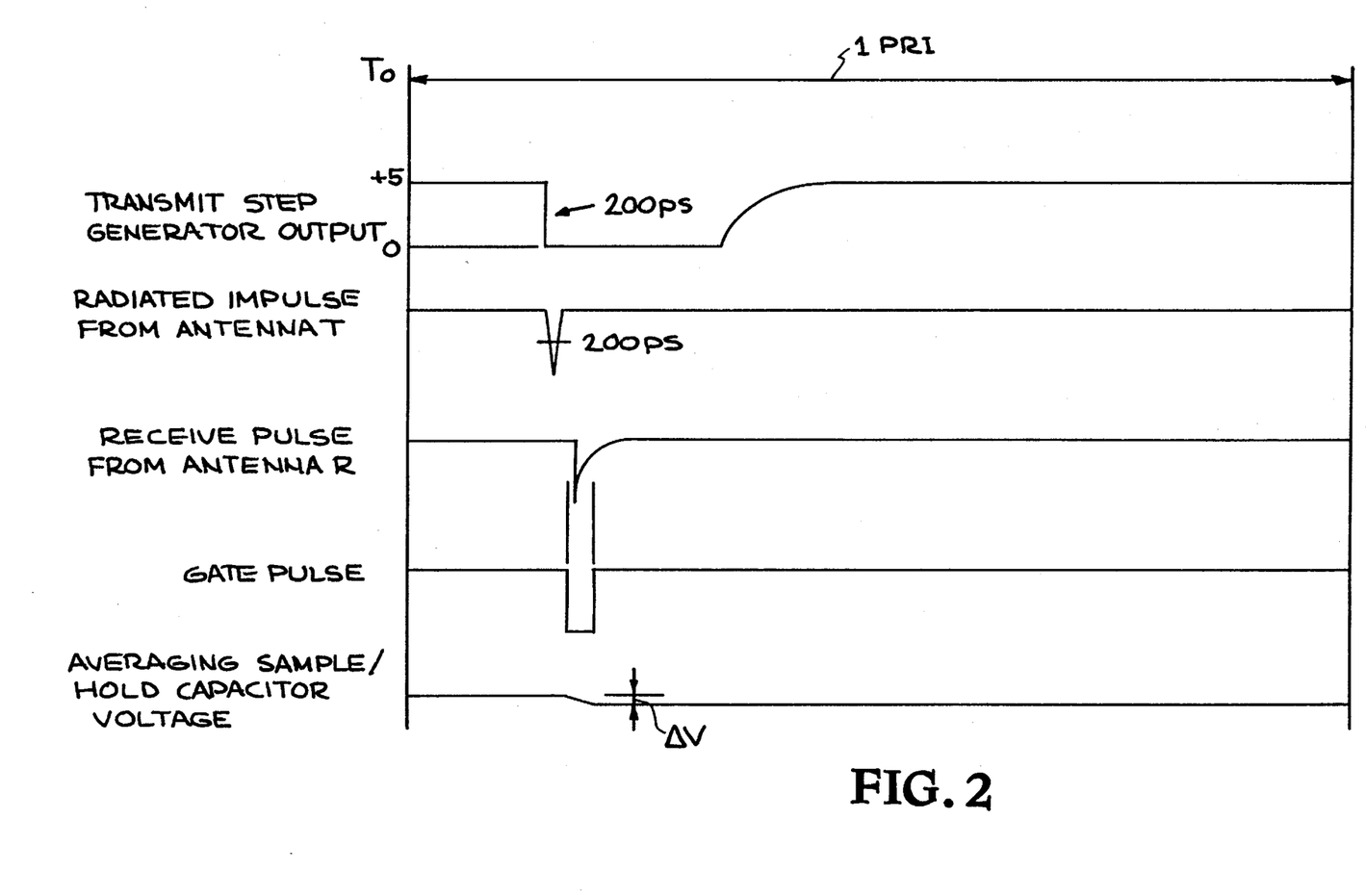
FIG. 2 is a timing diagram of the impulse radar studfinder.

The timing relationship is shown in FIG. 2. The five waveforms-are shown over one pulse repetition interval. The transmit step generator produces a +5 V to 0 V, 200 ps step, which produces a 200 ps wide radiated impulse from the transmit antenna. The reflected pulse from the receive antenna coincides with the gating pulse. Each received pulse produces an incremental voltage change $\Delta V$ on the capacitor of the S/H circuit. The capacitor voltage is the output of the averaging S/H circuit. The increment $\Delta V=1/N$ of the total received pulse where N is the number of samples averaged, typically about 10,000.

The noise voltage at the sample/hold circuit is reduced by a factor related to the square root of the number of samples averaged, 100× in this case, and by a factor related to the effective time constant of the averaging circuit relative to the PRI of the system and the instantaneous bandwidth of the sampler—a factor stemming from the sampled data nature of the sample/hold circuit. In all, greater than 60 dB noise reduction is obtained compared to a circuit with 2 GHz bandwidth, i.e., the bandwidth of the radiated pulse.

The sample/hold output is applied to the voltage summation element 36 in FIG. 1, which subtracts background reflections as described herein. The output of the summer 36 is amplified by amplifier (A) 38, typically 60 dB across a passband of DC-16 Hz, and applied to an indicator circuit 40. The indicator circuit 40 may consist of a linear arrangement of LEDs 42 that sequentially light in proportion to the applied voltage, which is linearly related to the reflection magnitude of the electromagnetic impulse.

The display circuit begins to respond at a level corresponding to approximately 100 microvolts appearing at the receive antenna terminal. Since systematic errors in the sample/hold circuit, the summer, and amplifier may amount to several tens of millivolts, this error must be subtracted out in order to detect a 100 microvolt change caused by a distant stud. In addition, front surface reflections from the wall contribute to the error voltage.

Therefore, when power is applied to the unit, a "power-on" detection (reset) circuit 44 closes the "calibrate" switch 46 for one second so the integrator 48 in the feedback path 50 of amplifier A servo's the output of amplifier A until an equilibrium is reached: the output of A is forced to equal the reference voltage applied to the integrator. Since integrators have extremely high DC gain, the voltage difference between the output of A and the reference is reduced to a negligible value. The display is also referenced to the same reference voltage as the integrator, so the indicator scales its response relative to the voltage deviation from the reference voltage. This power-on calibrate sequence leaves the unit ready to respond to changes in voltage caused only by a change in the impulses reflected off the wall or a stud.

Figure 3:
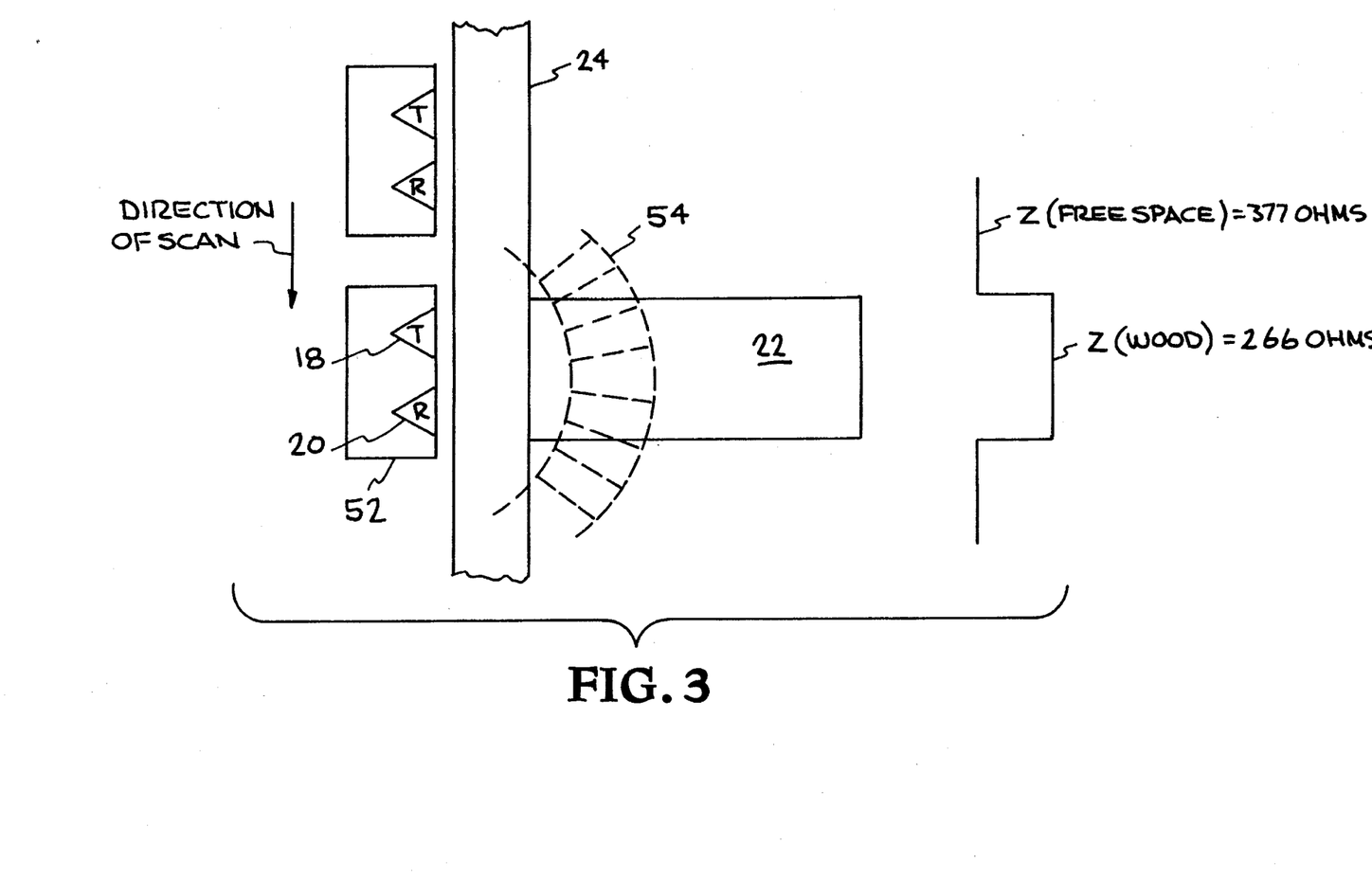
FIG. 3 illustrates the range gate location and reflection mechanism.
Figure 4A:
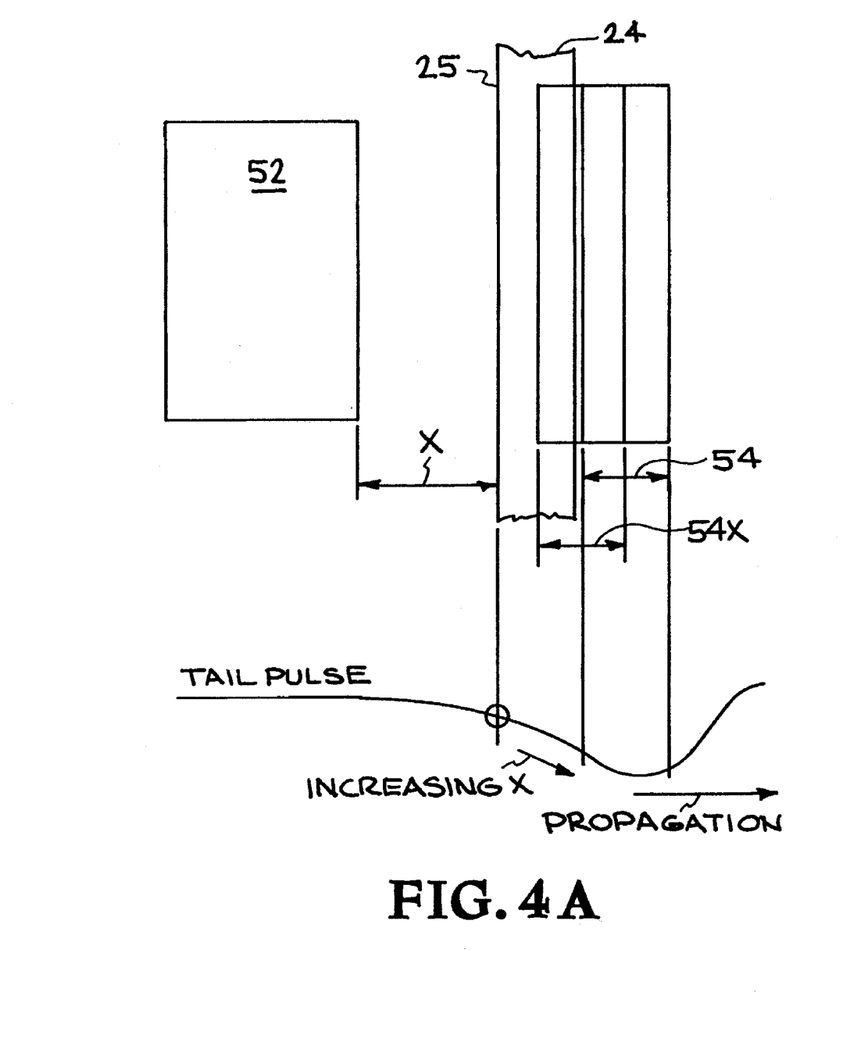

FIG. 3 depicts the geometry of the antennas and the effective physical location of the sample/hold gate as its position in time relative to the transmit pulse is projected into an equivalent position in space and scaled by the square root of the relative dielectric constant of the intervening building material ($\epsilon_r$~2–3). As shown in a top view, transmit antenna (T) 18 and receive antenna (R) 20 in studfinder housing 52 are positioned adjacent wall 24 and operate with a range gate 54 determined by the delay generator 30 (FIG. 1). The range gate typically extends about 1 inch behind the wall. The range gate is actually curved because of the spherical waves emitted by antenna T. However, over small distances, the range gate is approximately linear (as shown in FIGS. 4A,B).

The propagation impedance in free space $$Z_o(\text{space}) = \sqrt{\mu_0/\epsilon_0}$$

where $\mu_o$ is the permeability of a vacuum and $\epsilon_o$ is the permittivity of a vacuum. The propagation impedance in a material (wood) having $$\epsilon_r = 2 \text{ is } Z_o(\text{wood}) = \sqrt{\mu_0/\epsilon_r\epsilon_0} = Z_o(\text{space})/\sqrt{\epsilon_r} = Z_o(\text{space})/\sqrt{2}.$$

The free space propagation impedance is 377 ohms and the propagation impedance of wood ($E_r=2$) is 266 ohms. This difference in impedance causes a difference in the reflection magnitude when a stud is present. A profile of the propagation impedance $Z_o$ in the range gate location 54 is shown in FIG. 3.

In a one dimensional analogy to propagation along a transmission line, which can be equated to time domain reflectometry (TDR), reflections off a stud become equivalent to reflections from a transmission line discontinuity. The reflection coefficient, F, defined as $(Y-1)/(Y+1)$ where $Y=Z(\text{wall})/Z(\text{space})$, can be applied to determine what fraction of the radiated pulse is returned.

For example, if the wall material is wood with an $\epsilon_r=2$, the reflection magnitude, relative to 377 ohms, is 0.17. When a wood stud is behind the wood wall, no reflection occurs since there is no change in propagation impedance. Thus the difference in reflection magnitude between the presence and absence of a stud is 0.17. If the stud were metal, the reflection would be total, or 1.0. Thus, metal is easily discerned from wood by a 5.9× greater reflection magnitude.

Even if the metal has a much smaller cross-section, as may be the case with a wire, it is still easily discerned in practice as long as the polarization of the wire and the studfinder antenna match—which is generally the case for wires behind walls and for a vertical orientation of the studfinder.

This invention overcomes a serious limitation stemming from a variable reflection magnitude from the first surface 25 of the wallboard. The circuit loses its power-on calibration if the sensor is moved from the wall by even the slightest distance "x" in FIG. 4A. Once out of calibration, reliable detection of a stud is compromised. It is most desirable that the indicated reflection amplitude from the wallboard remain constant over a housing-to-wall distance of several inches.

Figure 4B:
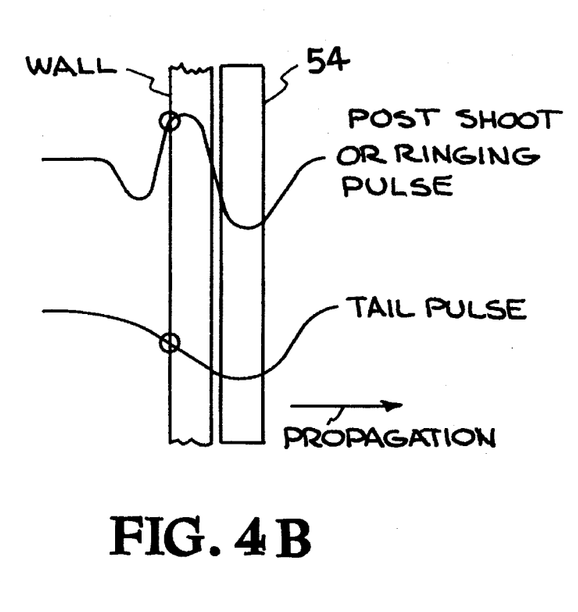
FIG. 4B shows a post shoot or ringing pulse.
Figure 4C:
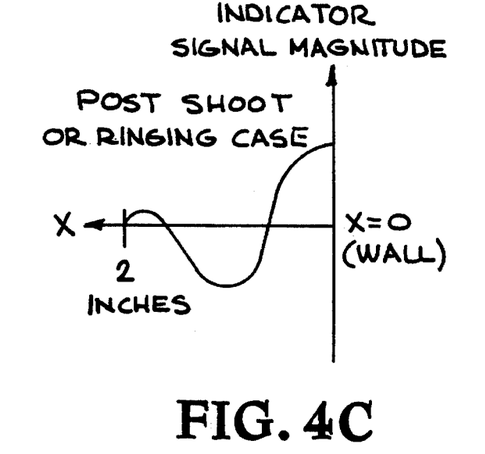
FIGS. 4C, D show the resulting indicator signals.

The problem of varying first surface reflection magnitude is caused by radiating a pulse, shown in FIG. 4B, that contains either post-shoot or ringing—a common effect when radiating ultra-wideband pulses through an antenna. What radiates later in time falls into the sampler's gate when reflected off objects closer than the intended range gate 54, i.e. there is a displaced range gate 54x. Accordingly, ringing components reflect off the front surface of the wall and fold into the reflections from the stud in simultaneity. Indeed, these front surface reflections can exceed the rear surface reflections. During power-on calibration, the front surface reflections are subtracted out, so the unit can properly detect a stud—until the unit is lifted slightly off the surface and the calibration is altered by changes in front surface reflections. Thus the sensor has little tolerance for rough surfaces or non-contact operation. Because of changing polarity of the pulse, the indicator signal can change polarity, as shown in FIG. 4C.

Figure 4D:
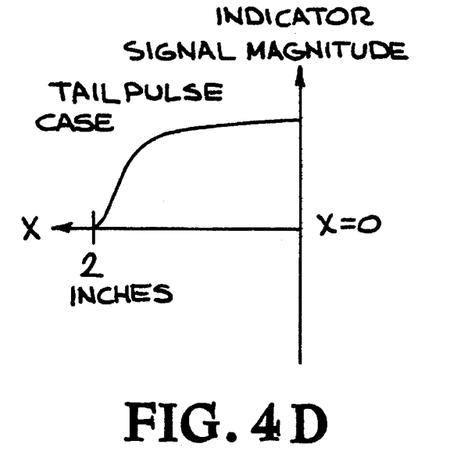

The solution for this problem is indicated in FIG. 4A by the radiated waveform, which has an exponential tail of the same voltage polarity as its peak voltage. If the peak of the pulse is spatially located behind the wall for stud detection, the center of the tail may then be spatially located at the front surface of the wall. When the calibrated studfinder is lifted from the wall (increase "x"), the diminishing surface return—caused by increasing distance—is compensated by the increasing tail amplitude that becomes positioned at the wall front surface. FIG. 4D shows the indicator signal (amplified reflection signal) for the tailpulse case, showing a constant signal over a 2" variation in "x". Thus in the preferred embodiment, the studfinder emits a pulse having the waveform shown in FIG. 4A. This can easily be done by proper design of the transmit antenna.

Figure 5:
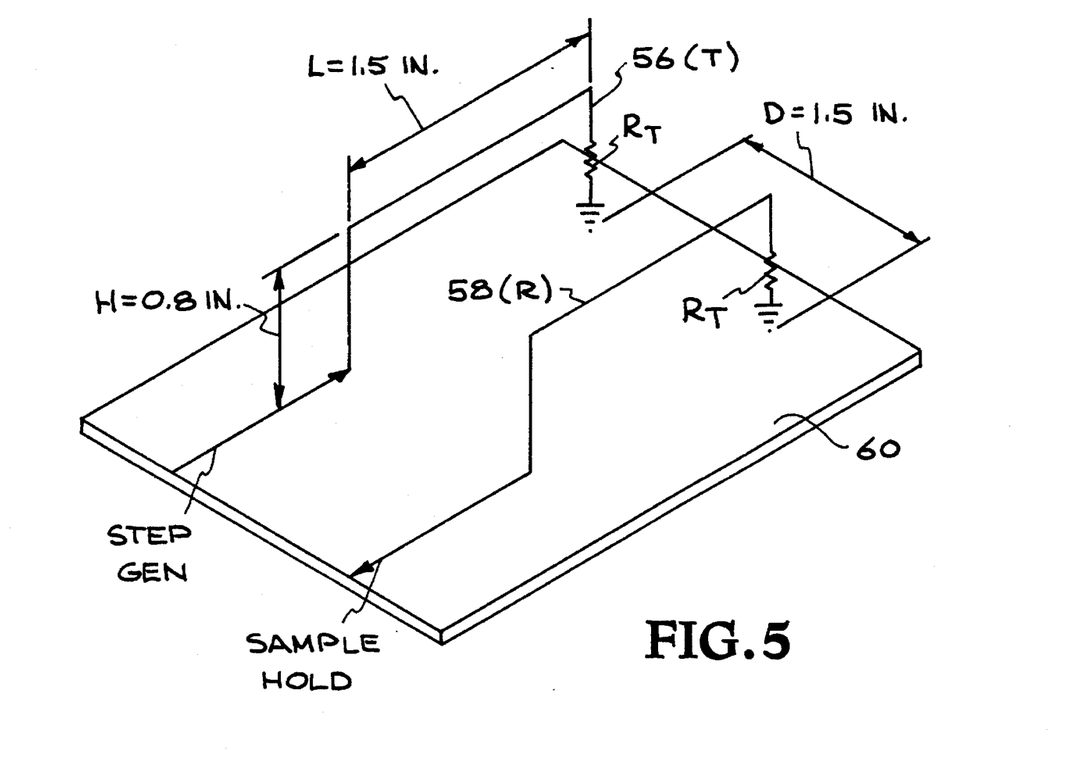
FIG. 5 shows a wire antenna configuration for the studfinder.

FIG. 5 is a sketch of the preferred configuration of the antennas. The antennas T, R are simple wires 56, 58 situated above a ground plane 60 and may be considered to be either leaky transmission lines or bent monopoles. Resistors $R_T$ are distal termination resistors that are set higher than the characteristic impedance of the lines. The value of $R_T$ affects the shape of the tail pulse, so $R_T$ can be fine-tuned to obtain a flat response characteristic versus distance from the wall surface.

In an illustrative embodiment, the ground plane is a copper ground plane circuit board. The antennas are #24 AWG enameled copper wire. Each antenna has a length L of 1.5" and a height H of 0.8".

The transmit antenna T is driven by a voltage step so its radiated waveform tends to be an impulse with a slight tail caused by the distal reflection from $R_T$, which is set to be higher than the propagation impedance of the 1.5" wire. A similar effect occurs at the receive antenna R, where there is no termination at the sample/hold input. The combination of high impedance and parasitic capacitance at the sample/hold input tend to integrate the receive pulse, further stretching the tail of the pulse. The propagation impedance of the 1.5" wire is about 200 ohms, and the value of $R_T$ is about 330 ohms.

Figure 6:
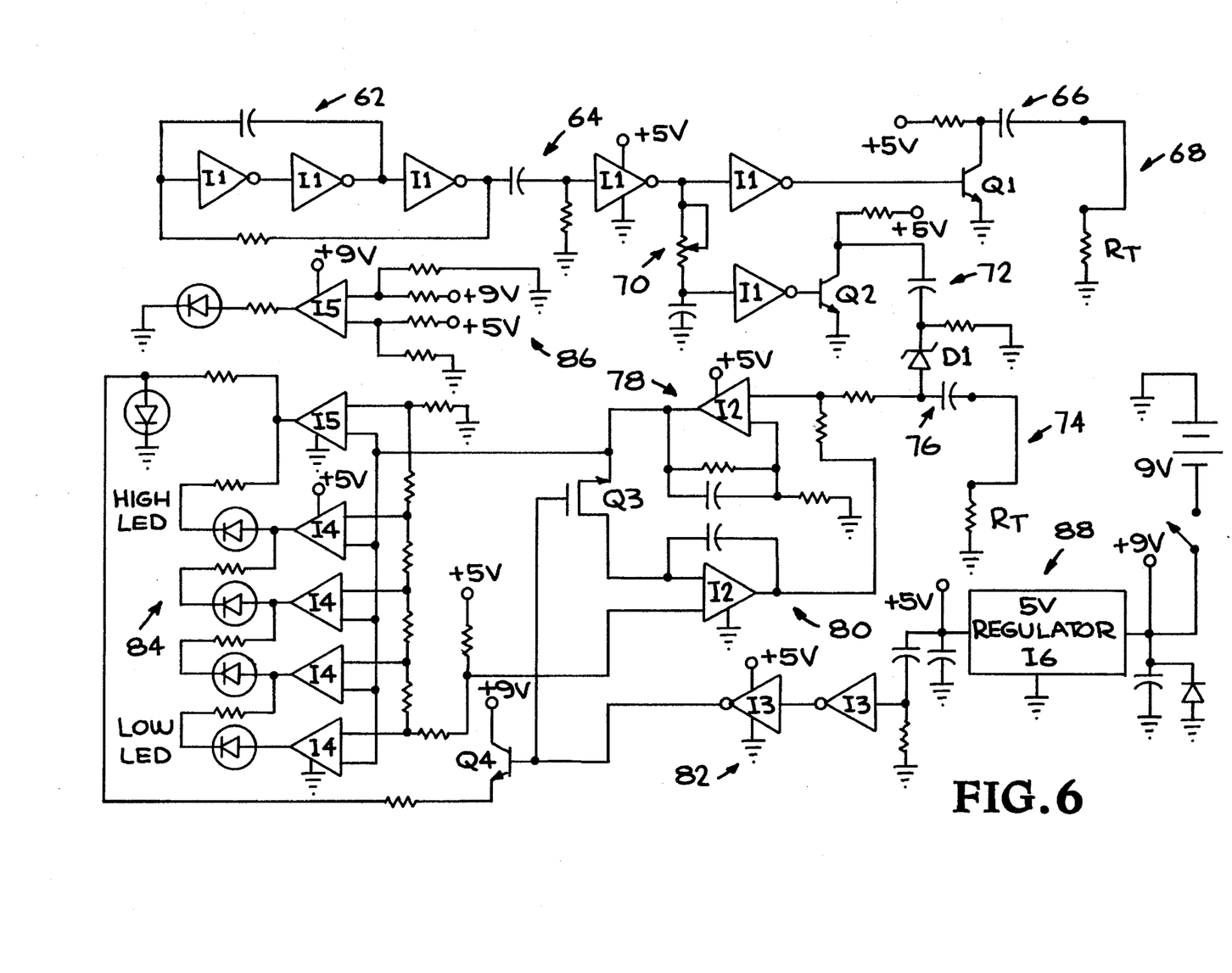
FIG. 6 is a schematic diagram of the impulse radar studfinder.

FIG. 6 shows a prototype embodiment of the studfinder. The PRI generator 62 is formed of three inverters (I1) and is followed by a pulse width limiter 64. The pulses pass through buffers (I1) to step generator 66 formed of a low cost TV tuner transistor Q1=BFW92, whose output is connected to transmit antenna 68 which is a wire loop. The pulses from PRI generator 62 also follow a second path through range delay generator 70 which is formed of a variable resistance plus stray capacitance and input capacitance of a buffer gate. The delayed pulse is input into step generator 72, formed of another transistor Q2=BFW92, which produces the gating pulse. Reflected signals are picked up by receive antenna 74 and input into S/H circuit (capacitor) 76 which is gated by the gating pulse through Schottky diode D1=MBD701. The output from S/H circuit 76 is input into amplifier 78 (I2). A second amplifier 80 (I2) is connected though calibrate switch (MOSFET) Q3 (part of I3) from the output of amplifier 78 back to its input to form the baseline subtractor/integrator circuit. The "power on" reset circuit 82 (I3) turns on transistor Q3 so that the output of amplifier 78 is fed back through operational amplifier 80 to subtract the background from the input of amplifier 78. The input of amplifier 78 serves as the summation element for the S/H circuit 76 output and the calibrate signal from amplifier 80. The output of amplifier 78 drives the indicator circuit 84 which is formed of a plurality of comparators (I4) referenced to different levels which drive associated LED's. The highest level LED "metal" is turned on by comparator (I5); the high reflectivity of metal produces a high indicator signal. A low battery test circuit 86 (I5) and voltage regulator circuit 88 (I6) are also included. In a preferred embodiment, I1=74HC04, I2=TLC27L2, I3=CD4007, I4=LM324, I5=LM358, and I6=78L05.

The impulse radar studfinder of this invention propagates an electromagnetic pulse, and since electromagnetic propagation scales by the square root of dielectric constant, the radar studfinder is substantially independent of building materials. Further, the propagating pulse will easily radiate across an air gap of several inches. The sensitivity of this invention is such that a stud can be detected behind several inches of concrete with the unit held an inch off the surface of the concrete (~40 dB signal-to-noise ratio). The studfinder can similarly be applied to locate other hidden objects.

Changes and modifications in the specifically described embodiments can be carried out without departing from the scope of the invention which is intended to be limited only by the scope of the appended claims.

I claim:

1. A portable device for locating a wall stud positioned behind a wall surface, comprising:

means for radiating a sequence of electromagnetic impulses toward the wall;

non-ringing antenna means for receiving reflected electromagnetic signals from the wall;

a detection circuit connected to the antenna means for detecting a change in amplitude of the reflected electromagnetic signals from a fixed range behind the wall; and indicator means connected to the detection circuit for indicating the change in amplitude of reflected electromagnetic signals whereby by moving the device adjacent to the wall, the change in amplitude of reflected electromagnetic signals from said fixed range caused by the stud in the wall as indicated by the indicating means defines the location of the wall stud.

2. The device of claim 1, further comprising a hand-held housing have a substantially flat surface, wherein the antenna means is mounted adjacent said housing flat surface and the device is moved with the flat surface in near proximity to the wall.

3. The device of claim 1, wherein the means for radiating a sequence of electromagnetic impulses comprises means for radiating unipolar electromagnetic impulses.

4. The device of claim 3, wherein the radiating means comprises means for radiating an impulse of less than 1 ns without a carrier frequency.

5. The device of claim 1 wherein the antenna means comprises:

a transmit antenna and a receive antenna.

6. The device of claim 1 wherein the detection circuit comprises an averaging sample/hold circuit for sampling and holding a plurality of reflected electromagnetic signals prior to indicating a change on the indicator means.

7. The device of claim 6 further comprising means for providing a gating pulse to the averaging sample/hold circuit.

8. The device of claim 7 wherein the means for providing a gating pulse comprises means for setting the fixed range at a range of about 1–2".

9. The device of claim 6 further comprising:

amplification means connected between the averaging sample/hold circuit and the indicating means;

a background subtract circuit connected to the amplification means.

10. The device of claim 1 further comprising means for radiating an electromagnetic pulse having a peak and an exponential tail of the same polarity.

11. Apparatus comprising:

a pulse repetition frequency (PRF) generator for producing a sequence of pulses;

a first step generator connected to the PRF generator for producing a sequence of transmit pulses;

a transmit antenna connected to the first step generator for transmitting the transmit pulses toward a surface;

a range delay generator connected to the PRF generator for producing a delayed sequence of pulses having a fixed delay relative to the transmit pulses;

a second step generator connected to the range delay generator for producing a sequence of gating pulses;

a receive antenna for receiving reflected pulses from an object in the path of the transmit pulses;

an averaging sample/hold (S/H) circuit for sampling a plurality of reflected pulses to produce an average reflected signal;

gating means connected between the receive antenna and the S/H circuit, and to the second step generator so that only reflected pulses from a fixed range are sampled by the S/H circuit;

amplification means connected to the S/H circuit to amplify the average reflected signal;

display means connected to the amplification means to display the amplified average reflected signal.

12. The apparatus of claim 11 wherein the range delay generator comprises means for producing about 0.5 ns fixed delay.

13. The apparatus of claim 11 wherein the first and second step generators comprise means for producing about 200 ps risetime unipolar pulses.

14. The apparatus of claim 11 wherein the display means comprise a plurality of light emitting diodes.

15. The apparatus of claim 11 further comprising a background subtract circuit connected to the input of the amplification means.

16. The apparatus of claim 15 wherein the background subtract circuit comprises:

an integrator connected in a feedback loop from the output to the input of the amplification means;

a calibrate switch in the feedback loop.

17. The apparatus of claim 16 further comprising a power-on reset circuit connected to the calibrate switch.

18. The apparatus of claim 11 wherein the transmit and receive antennas are wire loops terminated in resistors having a resistance greater than the impedance of the wire loops.

19. The apparatus of claim 18 wherein the transmit antenna is terminated in a resistor to produce a radiated pulse having a peak and an exponential tail of the same polarity.

20. A method for detecting a hidden object at a fixed distance behind a surface, comprising:

transmitting a sequence of ultra-wideband (UWB) unipolar radar pulses without a carrier frequency from a detection position toward the surface;

detecting reflected pulses from a fixed range from the detection position, said fixed range corresponding to the fixed distance of the object behind the surface;

averaging the detected pulses over repeated pulses to produce a measured signal;

measuring changes in amplitude of the measured signal produced by moving laterally along the surface so that transmitted pulses are reflected by the object to define the location of the object.

* * * * *